United States Patent [19]

Baxter

[11] Patent Number: 4,915,766

[45] Date of Patent: Apr. 10, 1990

[54] PREPARATION OF WOOD LAMINATES USING HIGH MOISTURE CONTENT VENEERS

[75] Inventor: Gene F. Baxter, Decature, Ga.

[73] Assignee: Georgia-Pacific Resins, Inc., Atlanta, Ga.

[21] Appl. No.: 300,238

[22] Filed: Jan. 23, 1989

Related U.S. Application Data

[63] Continuation of Ser. No. 917,545, Oct. 10, 1986, abandoned.

[51] Int. Cl.$^4$ ................................................ C09J 5/00
[52] U.S. Cl. .................................... 156/335; 264/109; 264/112; 525/493
[58] Field of Search ............... 156/335, 62.2; 525/493; 264/109, 112

[56] References Cited

U.S. PATENT DOCUMENTS

| | | |
|---|---|---|
| 2,191,802 | 2/1940 | Novotny et al. ............... 525/493 |
| 2,529,851 | 11/1950 | Scrutchfield . |
| 2,629,703 | 2/1953 | Vogelsang ..................... 525/493 |
| 2,886,540 | 5/1959 | McNaughtan et al. . |
| 3,321,358 | 5/1967 | Campbell et al. . |
| 3,412,068 | 11/1968 | Gemmill et al. . |
| 3,490,989 | 1/1970 | Hohbach et al. . |
| 3,878,021 | 4/1974 | Tiedeman . |
| 3,880,694 | 4/1975 | Freeman et al. . |
| 3,931,110 | 1/1976 | Freeman et al. . |
| 4,145,242 | 3/1979 | Chow . |
| 4,175,065 | 11/1979 | Andersson . |
| 4,239,577 | 12/1980 | Hartman et al. . |
| 4,267,141 | 5/1981 | Annis ..................... 264/331.22 X |
| 4,366,275 | 12/1982 | Silano et al. . |
| 4,400,480 | 8/1983 | Silano et al. . |
| 4,441,954 | 4/1984 | Hartman et al. . |

FOREIGN PATENT DOCUMENTS

| | | |
|---|---|---|
| 848495 | 8/1970 | Canada . |
| 0066560 | 4/1982 | European Pat. Off. . |
| 2606103 | 10/1976 | Fed. Rep. of Germany . |
| 3228667 | 2/1984 | Fed. Rep. of Germany . |

OTHER PUBLICATIONS

AMRES ® 2713 Waterproofing Resin for Starch Corrugating Adhesives, Georgia-Pacific Corporation.
Steiner, P. R., (1977) *Forest Products Journal*, "Thermal and Adhesive Characteristics of Acetone-Formaldehyde/Phenol-Formaldehyde Resins", vol. 27, No. 9, pp. 38–43.
CAB 90(8)55775v.
CAB 100(20)157564t.
CAB 86(4)17588.
CAB 87(12)86618p.
CAB 94(26)209945x.
CAB 97(6)39995f.
CAB 96(22)182166w.
CAB 94(18)141557q.
CAB 95(8)64126q.
CAB 95(8)64127r.
CAB 95(20)171418h.
CAB 73(16)78439x.
CAB 83(4)29814t.

*Primary Examiner*—Michael W. Ball
*Assistant Examiner*—Jeff H. Aftergut
*Attorney, Agent, or Firm*—Banner, Birch, McKie and Beckett

[57] ABSTRACT

A method for preparing wood laminates from a plurality of wood veneers using as the adhesive a combination of a phenolaldehyde resin with a low molecular weight acetone-formaldehyde resin as a cure rate accelerator.

30 Claims, No Drawings

PREPARATION OF WOOD LAMINATES USING HIGH MOISTURE CONTENT VENEERS

This application is a continuation of Ser. No. 917,545, filed October 10, 1986, now abandoned.

BACKGROUND OF THE INVENTION

1. Field of the Invention

The present invention pertains to the preparation of wood laminates using an improved adhesive. The present invention particularly relates to the preparation of wood laminates using a low molecular weight acetone-formaldehyde resin as a cure rate accelerator for a phenol-formaldehyde adhesive. The present invention permits the preparation of wood laminates from high moisture content veneers.

2. Description of Related Art

Due to their bonding and durability characteristics, phenol-formaldehyde resins have long been favored as the adhesive for preparing wood laminates such as plywoods, particularly wood laminates suitable for exterior use. Typically, these adhesives are applied to the mating surfaces of wood veneers and the veneers then are subjected to a pressing operation at an elevated temperature to consolidate them into a unitary panel and to cure the adhesive. Often, the pressing is performed in two stages to maximize output; using a first or pre-pressing stage at ambient temperature and under a pressure and for a time just sufficient to consolidate the veneers into a unitary panel. The consolidated panel can be stored and handled without shifting or separation of the veneers and afterwards can be treated under heat and pressure to cure the thermosetting adhesive and form the final laminate.

In preparing wood laminates such as plywood, it is conventional to dry the wood veneers to very low moisture content, i.e., to less than about 5% moisture (5 lbs. water/100 lbs. dry wood), before application of the adhesive and consolidation of the veneers. Use of high moisture content veneers in the conventional process invariably leads to a large number of lamination defects and an excessively large number of rejected panels because of poor lamination. The lamination defects are believed to be caused by steam formation between veneer layers and a blow out of the steam when pressure is released upon completion of the pressing cycle. As the temperature increases in the center of the veneers during consolidation, so does the vapor pressure of trapped steam. As the press is opened, the built-up vapor or steam seeks an avenue of escape and blows the panel. Sizable operating and capital costs have been incurred in the prior art to assure consistently low moisture content for wood veneers used in making wood laminates so as to eliminate lamination defects and reduce the number of rejected panels.

Even so, the prior art has recognized the advantages to be gained in both operating and capital costs if higher moisture content veneers could be employed in the preparation of wood laminates. In U.S. Pat. No. 4,239,577, for example, a process is described for preparing wood laminates from high moisture content wood veneers. In accordance with this process, panels are prepared using veneers having different moisture contents with higher moisture content veneers constituting the outer layers of the consolidated panel and lower moisture content veneers constituting the core. While this process purports to ameliorate problems encountered when using high moisture content veneers, it does not eliminate the need for drying at least some of the veneers to low moisture content.

In U.S. Pat. No. 4,441,945, an adhesive is described which purportedly permits the preparation of wood laminates using high moisture content veneers. The adhesive composition combines phenol-aldehyde resin, an alkaline catalyst and from 5-50%, based on the weight of resin solids, of bentonite clay. The adhesive also may contain other conventional additives such as fillers and extenders. Apparently, this adhesive has not received widespread acceptance in the plywood industry, which continues to search for ways to reduce substantially the need to dry high moisture content veneers before assembling them into unitary wood laminates.

Reduced drying requirements result in savings in capital costs and processing time and also lead to improvements in the dimensional stability of the consolidated wood laminants. conventional laminates made with veneers having less than about 5% moisture content tend to swell in size as the moisture content of the wood laminate increase to their equilibrium content gradually with time. In the summer months, the equilibrium moisture content of a wood laminates may be as high as about 10% by wt. Finally, the ability to prepare laminates using high moisture content veneers, e.g. about 10 wt. %, also relaxes the criticality of moisture control in veneer preparation.

DESCRIPTION OF THE INVENTION

The present invention relates to a method for preparing wood laminates, such as plywood, from a plurality of wood veneers using a phenol-aldehyde adhesive resin in combination with an acetone-formaldehyde resin as a cure rate accelerator. The method comprises (a) applying an adhesive to a mating surface of at least one of a plurality of veneers, said adhesive comprising a mixture of a thermosetting phenol-aldehyde resin, an alkaline catalyst and an acetone-formaldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to about 1:4 and at a pH of above about 8.0 to obtain an acetone-formaldehyde resin having a weight average molecular weight of less than about 5,000, and preferably less than about 2,500, and a polydispersity index in the range of about 2 to 20, preferably about 5 to 10; (b) assemblying said plurality of wood veneers into a panel by mating with the surface to which the adhesive has been applied, and (c) consolidating the panel at a temperature, pressure and for a time sufficient to cure the adhesive.

In accordance with conventional plywood production procedures, wood veneers used to make laminates have moisture contents of less than about 5% based on the dry weight of the wood. While useful laminates sometimes can be prepared using wood veneers having small areas or "spots" with higher moisture contents, e.g., up to about 10 wt. % moisture and higher, continuous production of acceptable laminates from veneers with overall moisture contents of greater than about 5 to 7% has not been possible using conventional procedures. As will be described in detail hereafter, the improved adhesive mixture of the present invention, however, makes it possible to prepare acceptable wood laminates from high moisture content veneer, i.e., wood veneer having an overall moisture content of greater than about 7% and up to about 10% and higher based on the dry weight of the wood, and generally having one or more "spots" of 15–20% moisture. Typically, veneer total moisture content should be kept below about 13%. In addition to making it possible to prepare wood laminates from high moisture content veneer, the improved adhesive mixture of the present invention alternatively permits a significant increase in the rate of plywood panel production (i.e. reduction in press time) when used with standard, dry veneer under standard plywood press conditions of temperature and pressure.

As used herein, the term "veneer" refers to thin sheets of wood produced for example by skiving a thin wood layer or sheet from a log. Generally, a veneer will have a thickness of about 0.125 inch (3.175 mm) to 0.167 inch (4.233 mm), and is provided as a 4'×8' piece for plywood preparation, although larger or smaller dimensions obviously can be employed. Representative wood varieties which can be used to prepare veneers for practicing the present invention include soft woods such as Southern pine, Douglas fir, Ponderosa pine, and the like, and hard woods such as oak, walnut and birch.

The adhesive used in connection with the method of the present invention has three essential components (1) a thermosetting phenol-aldehyde resin, (2) an alkaline catalyst, and (3) an acetone-formaldehyde resin.

The thermosetting phenol-aldehyde resin component of the adhesive used to practice the present invention (hereinafter referred to simply as the phenolic resin) can be any one of the wide variety of phenolic resole resins previously used for producing wood laminates. While hydroxybenzene-formaldehyde condensation products are used most often as the resin component for the adhesive, other phenol-aldehyde resins are in general use and may be employed. Illustrative of some of the aldehydes in addition to formaldehyde which may be used to prepare the phenolic resin are the aliphatic aldehydes such as acetaldehyde and propionaldehyde; aromatic aldehydes, such as benzylaldehyde and furfural; and other aldehydes such as aldol, glyoxal, and crotonaldehyde. Illustrative of the some of the phenols which may be employed in conjunction with or in place of hydroxybenzene are resorcinol, cresol, pyrocatechol, cresylic acid, xylenols, naphthols, polyphenols such as the bis-hydroxyphenyl alkanes as 2,2'bis-(4-hydroxyphenol)-propane. Generally, from about one to three mols of aldehyde per mol of phenol are employed to prepare the phenolic resin with a ratio of 1.6–2.5 mols of formaldehyde per mol of phenol being preferred. Normally, such resins are prepared by reacting the phenol and aldehyde monomers at an elevated temperature under alkaline reaction conditions until sufficient condensation between the phenol and aldehyde has occurred to yield a condensation product with the desired viscosity for the particular situation. Specified reaction conditions are well-known to those skilled in this art.

As is also well known in this art, other consituents will be added to the phenolic resin in order to impart certain desirable characteristics to the adhesive for use in preparing wood laminates, and the present invention is not limited to any particular phenolic resin composition. For example, in order to permit satisfactory cure under the elevated temperature and pressure consolidation conditions, the phenolic resin includes an alkaline catalyst. The catalyst is needed to drive the reaction between the phenol and aldehyde constituents during resin prepration and also must be present to effectuate a complete curing of the resin. The catalyst preferably is selected from the group consisting of alkali metal and alkaline earth metal hydroxides and carbonates. Sodium hydroxide is the preferred catalyst.

In the present invention, the catalyst is necessary not only to facilitate cure of the phenolic resin but also to effect a complete cure of the acetone-formaldehyde resin component, and thus constitutes an essential second component of the adhesive used in the inventive method. Generally, the alkaline catalyst will be added to the phenolic resin in an amount sufficient to provide a phenolic resin pH in the range of about 8.0 to about 12.5. If too little catalyst is present the full extent of the cure enhancement benefits obtained by combining the phenolic resin with the acetone-formaldehyde resin in accordance with the present invention are not realized; while use of too much catalyst significantly shortens the pot life of the adhesive without substantial further enhancement of the cure rate of the adhesive. Normally, an amount of catalyst between about 5 to 10%, preferably about 6 to 8% and most preferably about 7%, based on the weight of the phenolic resin will be sufficient. The bulk of this catalyst, e.g. about 85%, is added during preparation of the phenolic resin with the balance being added after the resin has been cooled to near ambient conditions.

In addition to the alkaline catalyst, other known accelerators such as alkali metal silicates, alkali metal borates, and alkali metal phosphates may be added to the phenolic resin in an amount of from about 0.5 to about 10% based on the weight of the phenolic resin.

The resin also typically will include thickeners, fillers and extenders. Powdered vegetable materials such as starch, nutshells (for example, walnut shells, pecan shells, coconut shells, ivory nut shells, horse chestnut shells, peanut shells, and the like), wood flours, barks, leaves, corn cob (Co Cob), rice hull and the like are usually mixed into the adhesive as fillers either alone or in combination with a diluent such as wheat flour (Glu X), sorghum flour and the like for preventing over penetration of adhesive into the wood veneer, for retaining a uniform adhesive viscosity to facilitate the spreading of the adhesive on the veneer surface, and for preventing the formation of interstices and cracks accompanying the shrinkage and aging of the cured resin after adhesion. Fillers often are used in an amount of from about 8 to 14% based on the weight of the phenolic resin. Inorganic extenders such as attapulgite clay also can be used. Small amounts of other conventional adjuvants such as surfactants, wetting agents and antifoaming agents also can be included in the phenolic resin, as will be recognized by those skilled in the art.

The third and final adhesive constituent necessary for the present invention is the acetone-formaldehyde resin (hereafter referred to simply as the acetone resin). The acetone resin is prepared by reacting acetone and formaldehyde in an aqueous reaction medium in the presence of an alkaline catalyst. To prepare acetone resins useful in the present invention, the acetone-to-formaldehyde mol ratio should be maintained in the range of about 1:2.7 to about 1:4, preferably about 1:3. The formaldehyde can be supplied, for example, as an aqueous solution, such as commercially available formalin, or as paraformaldehyde flakes. Suitable alkaline catalysts for use in the present invention to prepare the acetone resin include alkali metal and alkaline earth metal hydroxides and carbonates such as sodium hydroxide, potassium hydroxide, calcium hydroxide, sodium carbonate, and potassium carbonate, alkaline earth oxides such as barium oxide and alkali metal silicates such as sodium silicate. Sodium hydroxide is the preferred catalyst. A sufficient amount of catalyst is added to produce and maintain the reaction mixture at an alkaline pH of above about 7 and preferably between about 8 and 10.5. For example, when using sodium hydroxide as the catalyst, an amount of catalyst between about 2.0 and 3.0%, preferably between about 2.2 and 2.5%, based on the weight of the acetone, generally is used. As the reaction between acetone and formaldehyde proceeds, the alkaline catalyst is consumed, i.e. neutralized.

To produce an acetone resin useful in preparing the adhesive of the present invention, the conditions of the acetone-formaldehyde reaction, including inter alia, the reaction temperature, reaction time and alkaline catalyst addition are controlled carefully to limit the degree of resin advancement. In accordance with the present invention, the acetone resin is prepared by reacting the acetone and formaldehyde in an aqueous reaction mixture under controlled reaction conditions to yield a resin having a weight average molecular weight of at least about 500 but less than about 5,000 and preferably at least about 1,000 but less than about 2,500 and having a polydispersity index in the range of about 2-20 and preferably in the range of about 5-10. If the weight average molecular weight of the acetone resin is less than about 1,000 and/or the polydispersity index is above about 20, then the acetone resin is not sufficiently advanced and tends to over penetrate the wood veneers during plywood preparation; thus reducing the effect of the acetone resin on the cure rate of the phenolic resin adhesive. On the other hand, if the weight average molecular weight is above 5,000 and/or the polydispersity index is below about 2, then the acetone resin is too far advanced and a degradation in the strength of the adhesive bond is observed. Preferably, the acetone resin has an average molecular weight of below about 2,500 and a polydisperity index in the range of about 5-10 as such values more optimally balance the factors of cure rate and strength. Most preferably, the acetone resin has an average molecular weight of about 1,800 and a polydispersity index of about 7. The polydispersity index represents the quotient of the resin's weight average molecular weight and its number average molecular weight. For purpose of the present invention, the weight and number average molecular weights of an acetone resin can be determined by gel permeation chromatography using a dimethyl formamide (DMF) solvent, polyethylene glycol standards and procedures well known to those skilled in this art.

The acetone resin can be prepared using conventional equipment and conventional resin preparation techniques. The acetone and formaldehyde reactants are added along with water to a reaction vessel together with sufficient catalyst to establish the desired alkaline pH. The reaction preferably is conducted at a temperature of about 60°-65° C., although a reaction temperature from 40° up to reflux could be used. Because the reaction is highly exothermic, safety concerns militate against conducting the reaction at reflux. Longer reaction times are necessary at lower reaction temperatures. It is preferred to control reaction temperature and concomitantly control resin advancement by incrementally adding the alkaline catalyst to the reaction mixture with intermittent cooling. For example, the total catalyst charge may be added in 4-10 separate equal portions. Additionally, the catalyst preferably is added as a dilute aqueous mixture to minimize localized over-reaction. For example, when using sodium hydroxide as a catalyst, it preferably is added as a 12.5 weight percent aqueous solution. Once the reaction is complete, the resin is distilled to remove the bulk of the resin's water and yield a resin with a desired viscosity in the range of about 150 to 250 cps (measured at 25° C. using the No. 2 spindle at 6 RPM's).

To prepare the adhesive used in the method of the present invention, the alkaline phenolic resin is blended with the acetone resin. While there is wide latitude in the relative proportions of the phenolic resin-to-acetone resin, it is preferred to use an amount of acetone resin between about 10 to 50% by weight of the adhesive blend (i.e. the phenolic resin-acetone resin blend). If less than about 10% acetone resin is used, the cure characteristics of the adhesive normally are not sufficiently altered from that of the phenolic resin alone, while using more than about 50% acetone resin tends to degrade the plywood's adhesive bond. It is preferred to use between about 20-30% acetone resin.

Preferably, the phenolic adhesive is supplied as two components. The first component comprises the phenolic resin, with its complement of additives such as fillers, extenders and the like, together with the alkaline catalyst. The second component comprises the acetone resin. To facilitate changes in the relative proportion of the phenolic resin to the acetone resin in the adhesive mixture, the acetone resin generally is formulated with the same relative complement of additives such as fillers, extenders and the like, as is the phenolic resin. In such circumstances, an adhesive then can be prepared having any relative proportion of the two components simply by blending the first and second components using standard mixing equipment.

The adhesive may be applied to each mating surface of the wood veneers using any of the known procedures and equipment such as spray head applicators, curtain coaters, double roll spreaders and the like. Depending upon the method employed for applying the adhesive to the mating surface(s) of the wood veneers, the viscosity of the resin constituents may require minor optimization. Optimization may entail a minor adjustment in the monomer mol ratios used to prepare the phenolic and acetone resins, the degree of resin advancement and/or the amount and type of fillers and extenders used in formulating the final adhesive mixture.

The adhesive is applied to the veneers (adhesive spread) generally in an amount of from about 35–55 lbs., preferably about 45–50 lbs. per 1,000 sq. feet of single glue line. In preferred practice, the veneers then are consolidated into unitary panels by pre-pressing under ambient temperatures and at a contact pressure in the range of about 145 to 160 psi for a short period of time, e.g. up to about 10 minutes. The degree of pre-pressing is just sufficient to produce panels that resist delamination under normal conditions of storage and handling. Generally a satisfactory bond is obtained in the time required to attain the desired contact pressure.

Unfortunately, the addition of the acetone resin to a phenolic resin tends to degrade the strength of the pre-pressed bond. This result can be offset to some degree by co-forming a ureaformaldehyde adduct with the acetone resin. Thus, it is preferred to add a small amount of urea to the reaction mixture during preparation of the acetone resin. Example 1 demonstrates a preferred embodiment in this regard.

For a similar reason, the adhesive also may contain borax (sodium borate decahydrate) in an amount of up to about 0.15 to 0.4% based on the weight of the phenolic resin, as a tackifier for improving the strength of the pre-press bond. Because it would be difficult to add this much borax directly to the phenolic resin without developing a high viscosity or lumps in the adhesive mix, the borax preferably is added to the acetone resin component of the two component adhesive. Moreover, it has been found that by adding the borax early during preparation of the acetone resin, as specifically described in Examples 1 and 2, the buffering action of the borax tempers the exothermic effect of the alkaline catalyst (sodium hydroxide). Thus, the total alkaline catalyst charge can be added during preparation of the acetone resin in a fewer number of portions, yet still provide a controllable reaction. Use of borax in this manner constitutes an improved process for making an acetone-resin for use in the present invention. To avoid too great a buffering action, and thus leave unreacted formaldehyde and acetone in the acetone resin product, the initial borax addition should not exceed about 2.0% by weight based on the combined weight of the acetone and formaldehyde reactants. Preferably, the initial borax addition will be between about 1.0 and 2.0 wt. % of the acetone and formaldehyde reactants. If one desires to add additional borax it can be done near the end of the resin cook, for example, at the time the urea is added to the reaction mixture (see Examples 1 and 2).

Pre-pressed panels thereafter are consolidated at elevated temperatures and pressures to complete the cure of the adhesive mixture. The press schedule is influenced to some extent by the nature of the wood veneers used to make the panels. For example, when consolidating high moisture content veneers, which constitutes the preferred embodiment of the present invention, pressures of from about 175 to about 200 psi and temperatures in the range of about 285° to about 315° F. (140°-157° C.) are suitable. Press times vary according to the plywood construction, as generally is true with all plywood adhesives. A press time of about 5.25 to 6.0 minutes may be used for 19/32 inch or ⅝ inch construction, as an example. As a rule of thumb, lower press temperatures and lower levels of adhesive spreads are favored with high moisture content veneers to minimize blow-outs. Care must be observed, however, at lower spreads to avoid panel dry-out which can result is weak bonds and delaminations. On the other hand, when consolidating dry veneers, one has the option of either reducing the severity of the press conditions in the normal pressing cycle, or the press cycle itself can be significantly shortened while maintaining standard press temperatures. Pressures of from about 175 to 200 psi again are used. For 19/32 inch or ⅝ inch construction, the press time required is 5.0 to 5.5 minutes. The press time may be decreased further to about 4.5 to 5 minutes for this construction, by operating at a higher temperature in the range of about 315° to 345° F. (157°-174° C.). Similar procedures are followed for other plywood constructions, with sizable temperature or time reductions compared to those used for present commercial adhesives. Of course, one also could arrange the press schedules to realize partial improvements both in terms of the severity of press conditions and cycle time.

The following Examples are presented to illustrate the present invention and are not intended to constitute a limitation on its scope which is defined in the appended claims. Unless otherwise indicated, all parts and percentages reported in the Examples are by weight.

EXAMPLE 1

This example describes a method of preparing an acetone resin component of an adhesive useful in practicing the method of the present invention.

The following ingredients are added to a water cooled reaction vessel equipped with a mixer: 56 parts of a 50 wt. % aqueous formaldehyde solution, 1.2 parts starch, 1 part borax, 1.4 parts of a 12.5% sodium hydroxide solution, 18 parts acetone and 2.2 parts water. Generally, the water is used for introducing both the starch and borax into the reaction vessel as slurries, if these ingredients are added as dry solids then the additional water may be eliminated. The reaction mixture is allowed to reach a reaction temperature of 65° C. due to the exothermic reaction between acetone and formaldehyde. The reaction mixture is held at 65° C. until the exotherm subsides, which may take on the order of about 1 hour, and the reaction mixture then is cooled to 55° C. At this time, one part of a 12.5% by weight aqueous sodium hydroxide solution slowly is added to the reaction mixture while holding the temperature near 55° C. Then, the reaction mixture again is allowed to exotherm to 65° C. The reaction mixture is held at this temperature until the exotherm subsides (typically about ½-hour). The reaction mixture then is cooled again to 55° C. and a final part of a 12.5% by weight sodium hydroxide solution is added as above slowly to the reaction mixture, whereupon the batch again exotherms to 65° C. Three parts of a 50% by weight aqueous urea solution also are added to the reaction mixture and the reaction mixture is held at 65° for about 30 minutes. Finally, 4.3 parts of a 50% by weight borax slurry is added to the reaction mixture and the reaction mixture is maintained at 65° C. for an addition 90 minutes. Then, the reaction mixture is vacuum distilled at any temperature up to about 85° C. to remove the resin's volatile constituents (primarily water), typically about 20-22% by weight of the reaction mixture is removed—about 15-16% if the initial water addition is not used. After cooling, any of the widely used fillers and extenders can be added to the acetone resin.

EXAMPLE 2

This example describes another method of preparing an acetone resin component of an adhesive useful in practicing the method of the present invention.

The following ingredients are added to a water cooled reaction vessel equipped with a mixer: 54 parts of a 50 wt. % aqueous formaldehyde solution, 1.2 parts starch, 0.86 part of a 12.5% sodium hydroxide solution, 0.6 parts borax and 17.5 parts acetone. A portion of the acetone charge can be supplied by using distillate recovered from a previous batch of acetone resin. The reaction mixture is allowed to reach a reaction temperature of 60° C. due to the exothermic reaction between acetone and formaldehyde. The reaction mixture is held at 60° C. until the exotherm subsides, which may take on the order of about 2 hours, and the reaction mixture then is cooled to about 55° C. Then, 0.8 part of a 12.5% by weight aqueous sodium hydroxide solution slowly is added to the reaction mixture at a temperature of 55°-60° C. The reaction mixture is again allowed to exotherm to a temperature of 60°-65° C. and is held at that temperature until the exotherm subsides (generally about an hour). The above procedure of cooling the reaction mixture to about 55° C., slowly adding 0.8 part of an 12.5% by weight aqueous sodium hydroxide solution and allowing the reaction mixture to exotherm to a temperature of 60°-65° C. is repeated two more times. Then, the reaction mixture is distilled at atmospheric pressure to reduce the acetone content of the resin to less than about 0.05%; normally about 15-20% by weight of the reaction mixture is removed. The reaction mixture then is cooled to about 70° C. and 1.5 parts urea are added. After holding the mixture above 65° C. for about 30 minutes, 2.4 parts of borax are added during final cooling of the resin.

COMPARATIVE EXAMPLE 2

This Example describes the preparation of the acetone resin component of a plywood adhesive using a procedure analogous to the procedure described by P. R. Steiner in the September 1977 issue of *Forest Products Journal*. A reactant mixture having a formaldehyde-to-acetone mol ratio of 3.0 was prepared by mixing 1754.2 g of 52% formaldehyde, 588.5 g of acetone and 47.4 g of water. 15.7 ml of a 25% sodium hydroxide solution were added dropwise while the temperature of the reaction mixture was maintained at 45° C. by cooling. A 25% sodium hydroxide solution, instead of a 50% solution, was used because of its lower viscosity which facilitated its addition. Over the next hour, 23.5 ml of 25% by weight sodium hydroxide solution were added in five separate portions to the reaction mixture in order to keep the reaction temperature near 45° C. The temperature then was allowed to increase to 50° C. and, at approximately 20 minutes intervals, 7.8 ml additions of 25% sodium hydroxide were added and the polymerization was followed by measuring the dilutability in acetone of a small volume of the reaction mixture. The reaction was terminated once a dilutability of 6 parts acetone to 1 part resin was attained. Total reaction time was 225 minutes. The pH of the reaction mixture was 10.4, it has a viscosity of 45 cps and a solids content of about 47%. On storing this resin at room temperature, the pH dropped to 7.3 after 8 days. An analysis of this resin indicated that it has a weight average molecular weight of about 8,400 and a polydispersity index of about 33. The total quantity of sodium hydroxide added in the preparation of this resin based on acetone, was 5.1%.

EXAMPLE 3

This example compares the relative performance of the acetone resins of Example 2 and Comparative Example 2 when combined with a standard phenolic resin adhesive for plywood manufacture, GP-553 available from Georgia-Pacific Corporation, Atlanta, Georgia. In all tests, the acetone resins were blended with the phenolic resin in a weight ratio of 75 parts phenolic resin with 25 parts acetone resin (on a resin solids basis). Each adhesive had the same level of fillers and extenders and employed the same level of sodium hydroxide catalyst.

The adhesives, denominated adhesive A (the invention) and adhesive B (the prior art) were used to consolidate ⅛-inch thick Southern pine veneer cut to 1 foot squares and conditioned to a moisture content reported in Table 1 below. The adhesive was applied to the veneer by a double roll spreader at a loading of 36-39 grams per core. The veneers were stacked by hand (the number of plys is indicated in Table 1) and after about 15 minutes were pre-pressed at ambient temperature for 4 minutes at 150 psia. Hot press conditions for consolidating the panels and curing the adhesive are reported in Table 1. The consolidated boards then were hot stacked for 16 hours and afterward were subjected to vacuum-pressure testing in accordance with the American Plywood Association (APA) procedure for measuring wood failure. As reported in Table 1, panels made in accordance with the present invention were substantially superior to those prepared using an adhesive formulated with the acetone resin of Comparative Example 1. Higher wood failures indicate improved bond strength since lower wood failures are indicative of a high incidence of glue line failures.

TABLE 1

| Experimental Set No. | Consolidation Condition | | | | Veneer Moisture Content (%) | Wood Failure % | |
|---|---|---|---|---|---|---|---|
| | No. of Plies | Temp. (°F.) | Time (min) | Pressure (psi) | | Example 2 Resin | Comparative Example 2 Resin |
| 1 | 5 | 300 | 7 | 200 | 13.8 | 65.3 | 13.5 |
| 2 | 3 | 300 | 3 | 200 | 9.6 | 92.8 | 38.5 |
| 3 | 3 | 275 | 3 | 200 | 9.6 | 89.0 | 22.8 |
| 4 | 3 | 275 | 2.75 | 200 | 9.6 | 77.3 | 9.5 |
| 5 | 3 | 275 | 2.5 | 200 | 9.6 | 71.8 | 0 |

EXAMPLE 4

The preparation technique of Comparative Example 2 was repeated with only minor differences to yield another acetone-formaldehyde resin. The most notable difference in the preparation procedure was that the acetone dilutability value of 6 was reached after the twelfth addition of sodium hydroxide. Thus, the thirteenth addition was not made. This acetone resin was blended with the phenolic resin used in Example 3 (GP-553), and the resulting adhesive was used to consolidate three-ply wood laminates from ⅛-inch wood veneers having a 9.6% moisture content using the consolidation conditions of experimental set number 2 reported in Table 1. The acetone resin was used both when fresh and after the resin had been aged for 10 days to obtain a pH of 7.2. The percent wood failure results of these two experimental sets using the APA vacuum-pressure testing procedure were 55.8 and 53.8%, respectively. While these values are somewhat better than the 38.5% wood failure obtained in Experimental Set No. 2 of Example 3, these results are far below the 92.8% wood failure figure obtained using the adhesive made with the acetone resin of Example 2. This example also indicates that aging of the comparative Example 2 acetone resin had little effect on its performance.

EXAMPLE 5

This example describes the preparation of wood laminates employing veneers with various moisture contents, including high moisture veneers. The veneers used were 1/6 inch thick and their veneer moisture contents were reported as 0-15%, which indicates that the veneer had no region of more than 15% moisture, and 16–22%, which indicates that the veneer had regions of 16–22% moisture. The adhesive used in this example included 80 parts of a standard phenolic plywood resin and 20 parts of the acetone resin of Example 1. Panels having from 3 to 5 veneer layers were prepared using adhesive application levels (adhesive spreads) between 42–54 pounds per 1000 square feet of single glue line (MSGL). Prepressing of the panels was done at 160–165 psi for generally between 5–6 minutes; while a temperature in the range of 270°–330° F.; a pressure of 145–190 psi and a press time of 3–7 minutes was used for hot pressing. Panels were tested for wood failure using the APA vacuum-pressure method, and panels having percent wood failures ranging from 71–99% were obtained. The average wood failure value for all APA tested panels was 85%. Several panels also were selected for 300 cycle automatic boil tests and complete results for these particular panels are reported below in Table 2.

TABLE 2

| Sample No. | CONSOLIDATED CONDITIONS | | | | WOOD FAILURE | |
|---|---|---|---|---|---|---|
| | No. of Plys | Moisture Content % | SPREAD (#/MSGL) | Press Temp °F. | Original | After 300 cycles |
| 1 | 3 | 0–15 | 48–50 | 300 | 84 | 87 |
| 2 | 3 | 0–15 | 48–50 | 330 | 90 | 86 |
| 3 | 4 | 0–15 | 46–48 | 315 | 86 | 82 |
| 4 | 4 | 0–15 | 46–48 | 315 | 85 | 84 |
| 5 | 4 | 16–20 | 46–48 | 285 | 91 | 83 |
| 6 | 4 | 0–15 | 52–54 | 315 | 81 | 84 |
| 7 | 5 | 0–15 | 46–48 | 315 | 86 | 79 |
| 8 | 5 | 0–15 | 46–48 | 300 | 87 | 83 |
| 9 | 5 | 16–20 | 46–48 | 300 | 96 | 86 |
| 10* | 5 | 0–15 | 46–48 | 320 | — | 71 |
| 11* | 5 | 0–15 | 46–48 | 320 | — | 80 |

*Used only phenolic adhesive -- no acetone resin added

While certain specific embodiments of the invention have been described with particularity herein, it will be recognized that various modifications thereof will occur to those skilled in the art. Therefore, the scope of the invention is to be limited solely by the scope of the appended claims.

I claim:

1. A method for making wood laminates from a plurality of wood veneers comprising (a) applying an adhesive to a mating surface of at least one of a plurality of veneers, said adhesive comprising a mixture of an alkaline catalyst and a blend of a thermosetting phenol-aldehyde resin and an acetone-formaldehyde resin, said blend having between about 0.11 to 1 part by weight acetone-formaldehyde resin per part by weight of phenol-aldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a pH of above about 8.0 to obtain an acetone-formaldehyde resin having a weight average molecular weight of at least about 1,000 but less than about 2,500 and a polydispersity index in the range of about 2 to 20; (b) assemblying said plurality of wood veneers into a panel by mating with the surface to which the adhesive has been applied, and (c) consolidating the panel at a temperature, pressure and for a time sufficient to cure the adhesive.

2. A method for making wood laminates from a plurality of wood veneers having a total moisture content of between 7–13 wt. % comprising (a) applying an adhesive to a mating surface of at least one of a plurality of veneers, said adhesive comprising a mixture of an alkaline catalyst and a blend of a thermosetting phenol-aldehyde resin and an acetone-formaldehyde resin, said blend having between about 0.25 to 0.43 part by weight acetone-formaldehyde resin per part by weight of phenol-aldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a pH of above about 8.0 to obtain an acetone-formaldehyde resin having a weight average molecular weight between 1,000 to 2,500 and a polydispersity index in the range of about 5 to 10; (b) assemblying said plurality of wood veneers into a panel by mating with the surface to which the adhesive has been applied, and (c) consolidating the panel at a temperature, pressure and for a time sufficient to cure the adhesive.

3. The method of claim 2 wherein said alkaline catalyst is selected from the group consisting of sodium hydroxide, sodium carbonate, potassium hydroxide, potassium carbonate, calcium hydroxide and barium oxide.

4. The method of claim 2 wherein said alkaline catalyst is sodium hydroxide.

5. The method of claim 1 wherein said plurality of veneers have a total moisture content of between 7–13 wt. %.

6. The method of claim 2 wherein the mol ratio for acetone to formaldehyde used to prepare said acetone-formaldehyde resin is about 1:3.

7. The method of claim 2 wherein said adhesive is applied to said mating surface in an amount from about 35 to 55 lbs. per 1,000 sq. feet of single glue line.

8. The method of claim 1 wherein said panel is consolidated at a temperature in the range of 285° to 345° F. and at a pressure in the range of 175 to 200 psi.

9. The method of claim 5 wherein said panel is consolidated at a temperature in the range of 285° to 315° F. and at a pressure in the range of 175 to 200 psi.

10. A process for preparing an acetone-formaldehyde resin comprising
 (a) blending acetone and formaldehyde in an aqueous reaction mixture at an acetone to formaldehyde mol ratio in the range of about 1:2.7 to 1:4;
 (b) adding to said reaction mixture from about 1.0 to 2.0% borax based on the weight of the acetone and formaldehyde reactants;
 (c) initiating a reaction in the presence of the added borax between acetone and formaldehyde in said reaction mixture by adding an alkaline catalyst to said reaction mixture; and (d) controlling the reaction between said acetone and formaldehyde by alternating said alkaline catalyst addition with cooling to produce an acetone-formaldehyde resin having a weight average molecular weight of less than about 5,000 and a polydispersity index in the range of about 2 to 20.

11. The process of claim 10 wherein said reaction is controlled to produce an acetone-formaldehyde resin having a weight average molecular weight between about 1,000 and 2,500 and a polydispersity index in the range of about 5 to 10.

12. The process of claim 11 wherein said alkaline catalyst is selected from the group consisting of sodium hydroxide, sodium carbonate, potassium hydroxide, potassium carbonate, calcium hydroxide and barium oxide.

13. The process of claim 11 wherein said alkaline catalyst is sodium hydroxide.

14. The process of claim 11 wherein the mol ratio of acetone to formaldehyde is about 1:3.

15. The process of claim 11 wherein said acetone and formaldehyde are reacted at a temperature in the range of 60° to 65° C.

16. A method for making wood laminates from a plurality of wood veneers comprising (a) applying an adhesive to a mating surface of least one of a plurality of veneers, said adhesive comprising a mixture of an alkaline catalyst and a blend of a thermosetting phenol-aldehyde resin and an acetone-formaldehyde resin, said blend having between about 0.11 to one part by weight acetone-formaldehyde resin per part by weight of phenol-aldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a ph of above about 8.0, wherein said alkaline catalyst is sodium hydroxide and said ph is maintained by adding between about 2.0 and 3.0 percent by weight sodium hydroxide based on the weight of said acetone to said aqueous reaction mixture during preparation of said acetone-formaldehyde resin, (b) assembling said plurality of wood veneers into a panel by mating with the surface to which the adhesive has been applied, and (c) consolidating the panel at a temperature, pressure and for a time sufficient to cure the adhesive.

17. A method for making wood laminates from a plurality of wood veneers comprising (a) applying an adhesive to a mating surface of least one of a plurality of veneers, said adhesive comprising a mixture of an alkaline catalyst and a blend of a thermosetting phenol-aldehyde resin and an acetone-formaldehyde resin, said blend having between about 0.11 to one part by weight acetone-formaldehyde resin per part by weight of phenol-aldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a ph of above about 8.0, wherein said pH is maintained by adding between about 2.9 and 4.4 percent by mol alkaline catalyst based on the mols of said acetone to said aqueous reaction mixture during preparation of said acetone-formaldehyde resin, (b) assembling said plurality of wood veneers into a panel by mating with the surface to which the adhesive has been applied, and (c) consolidating the panel at a temperature, pressure and for a time sufficient to cure the adhesive.

18. The method of claim 17 wherein said alkaline catalyst is selected from the group consisting of alkali metal hydroxides, alkaline earth metal hydroxides, alkali metal carbonates, alkaline earth metal carbonates and alkaline earth oxides.

19. The method of claim 18 wherein said alkaline catalyst is selected from the group consisting of sodium hydroxide, potassium hydroxide, calcium hydroxide, sodium carbonate, potassium carbonate, and barium oxide.

20. The method of claim 17 wherein said alkaline catalyst is an alkali metal silicate.

21. The method of claim 18 wherein said plurality of veneers have a total moisture content of between 7-13 wt. %.

22. The method of claim 21 wherein said adhesive is applied to said mating surface in an amount from about 35 to 55 lbs per 1,000 sq. feet of single glue line.

23. The method of claim 22 wherein said panel is consolidated at a temperature in the range of 285° to 315° F. and at a pressure in the range of 175 to 200 psi.

24. The method of claim 2 wherein said blend has between about 0.25 to 0.43 part by weight acetone-formaldehyde resin per part by weight of phenol-aldehyde resin.

25. The method of claim 17 wherein said blend has between about 0.25 to 0.43 part by weight acetone-formaldehyde resin per part by weight of phenol-aldehyde resin.

26. An adhesive useful for bonding wood veneers comprising a mixture of an alkaline catalyst and a blend of a thermosetting phenol-aldehyde resin and an acetone-formaldehyde resin, said blend having between about 0.11 to one part by weight acetone-formaldehyde resin per part by weight of phenol-formaldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a ph of above about 8.0 to obtain an acetone-formaldehyde resin having a weight average molecular weight of less than about 2500 and a polydispersity index in the range of about 2 to 20.

27. The adhesive of claim 26 wherein said acetone-formaldehyde resin has a polydispersity index in the range of about 5 to 10.

28. The adhesive of claim 26 wherein said alkaline catalyst is selected from the group consisting of sodium hydroxide, sodium carbonate, potassium hydroxide, potassium carbonate, calcium hydroxide and barrium oxide.

29. An adhesive useful for bonding wood veneers comprising a mixture of an alkaline catalyst and a blend of a thermosetting phenol-aldehyde resin and an acetone-formaldehyde resin, said blend having between about 0.11 to one part by weight acetone-formaldehyde resin per part by weight of phenol-aldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a pH of above about 8, wherein said alkaline catalyst is sodium hydroxide and said pH is maintained by adding between about 2.0 and 3.0 percent by weight sodium hydroxide based on the weight of said acetone to said aqueous reaction mixture during preparation of said acetone-formaldehyde resin.

30. An adhesive useful for bonding wood veneers comprising a mixture of an alkaline catalyst and a blend of a thermosetting phenol-aldehyde resin and acetone-formaldehyde resin, said blend having between about 0.11 to one part by weight acetone-formaldehyde resin per part by weight of phenol-aldehyde resin, said acetone-formaldehyde resin having been prepared by reacting acetone and formaldehyde in an aqueous reaction mixture under controlled reaction conditions at an acetone to formaldehyde mol ratio in the range of about 1:2.7 to 1:4 and at a pH of above about 8.0, wherein said pH is maintained by adding between about 2.9 and 4.4% by mol alkaline catalyst based on the mols of said acetone to said aqueous reaction mixture during preparation of said acetone-formaldehyde resin.

* * * * *